Sept. 8, 1936.  N. BALYOZIAN  2,053,314
REFILLABLE PLASTIC MATERIAL CONTAINER
Filed Jan. 30, 1933  4 Sheets-Sheet 2
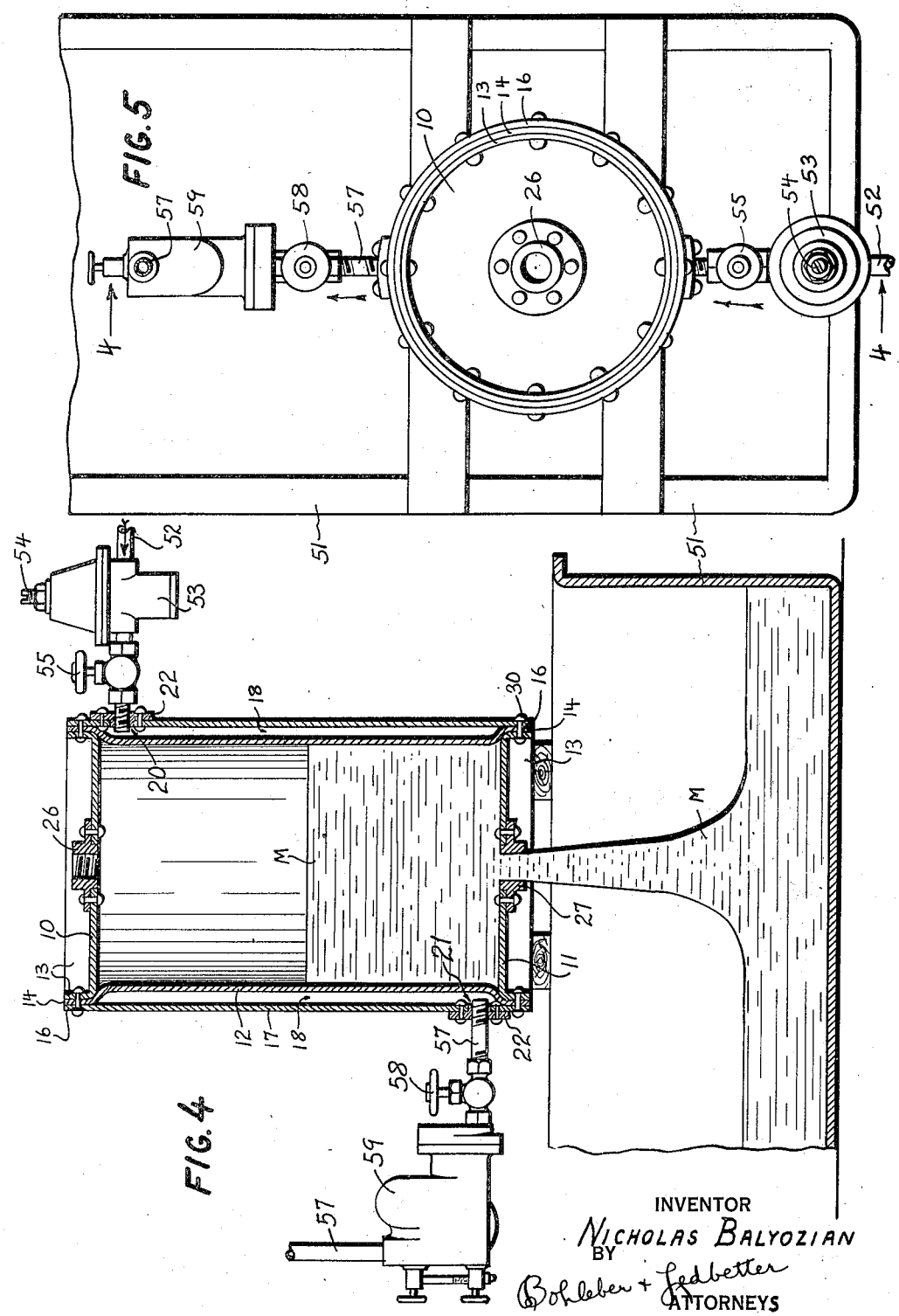
INVENTOR
*Nicholas Balyozian*
BY
*Bohleber + Ledbetter*
ATTORNEYS

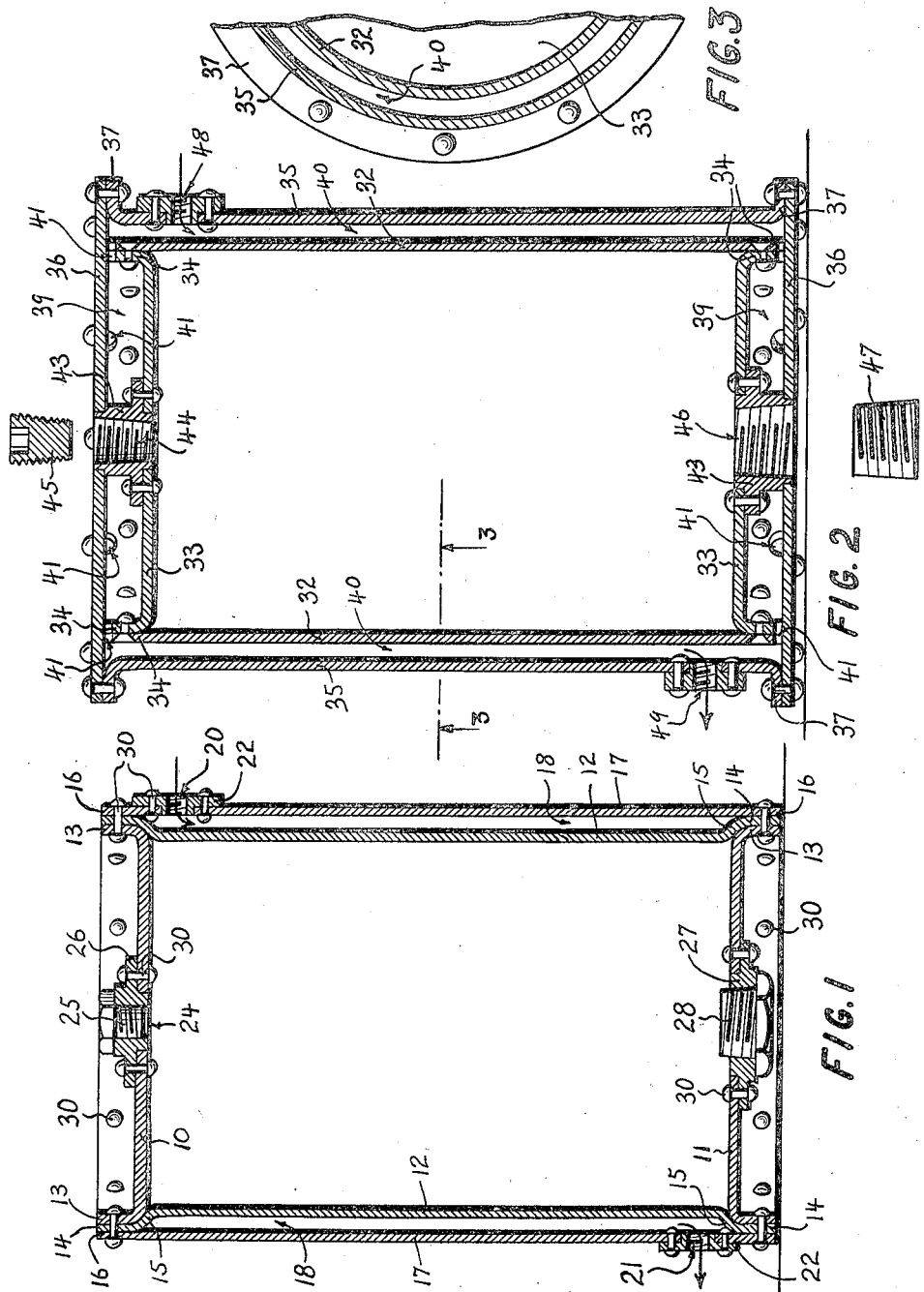

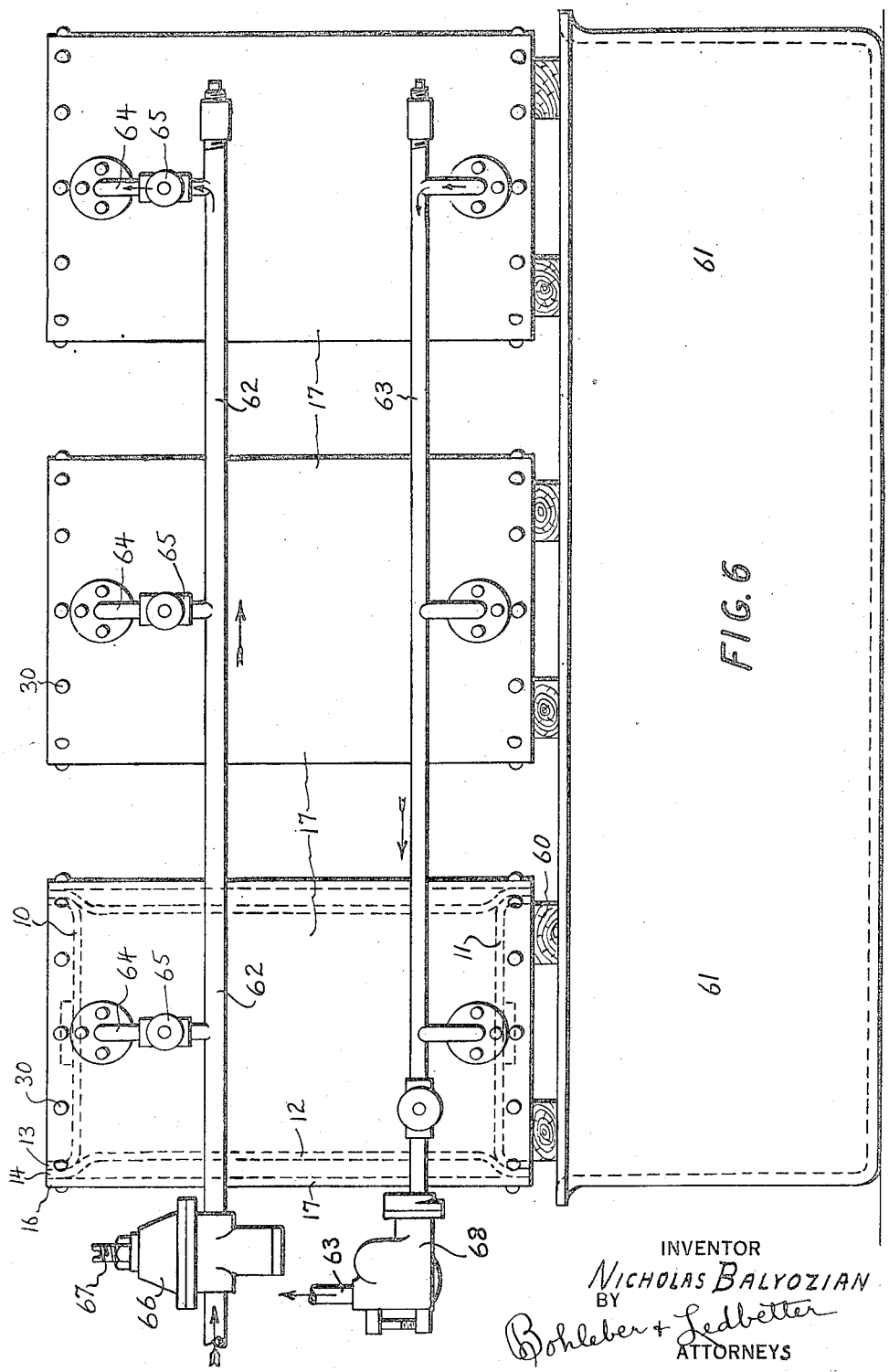

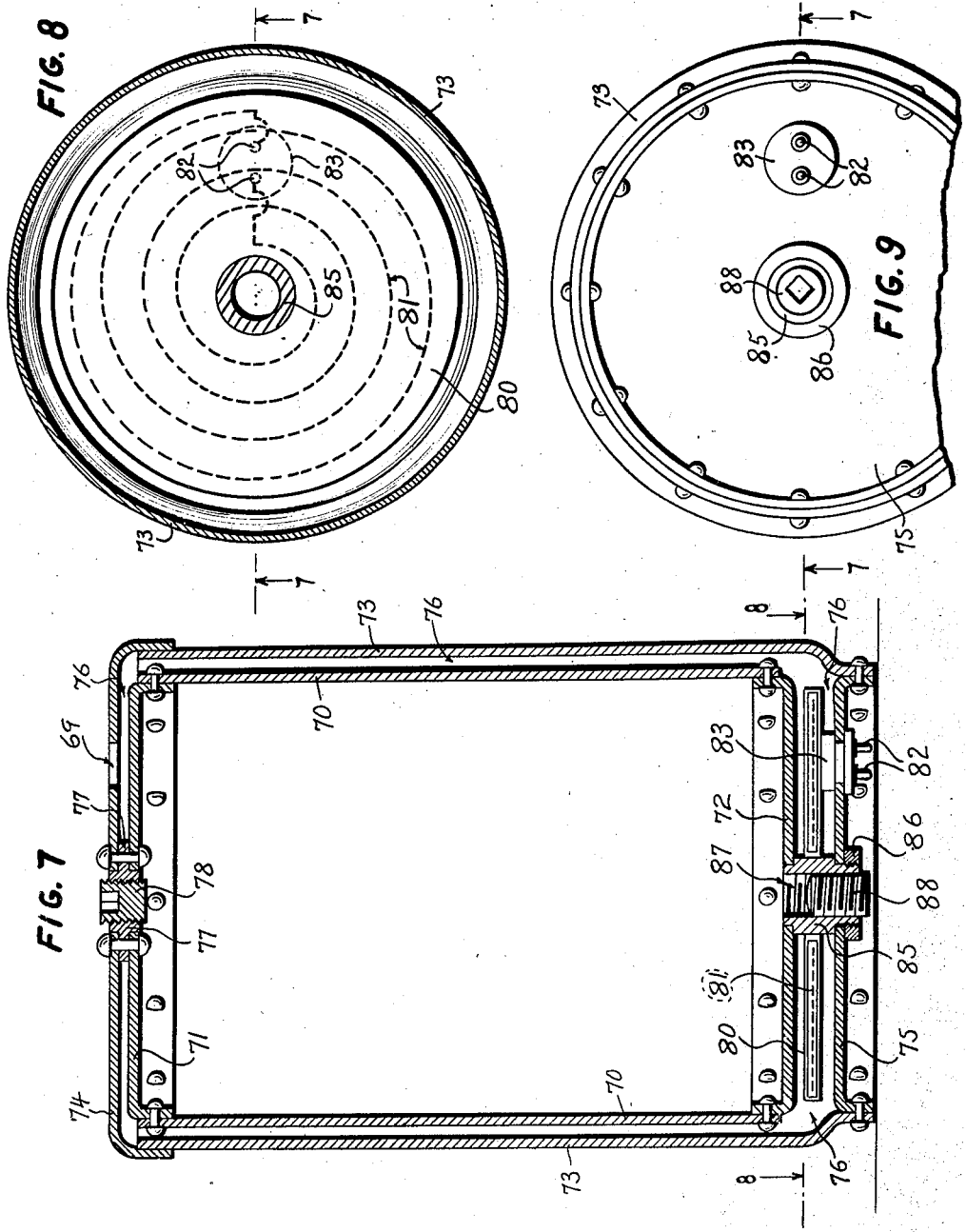
Sept. 8, 1936.   N. BALYOZIAN   2,053,314
REFILLABLE PLASTIC MATERIAL CONTAINER
Filed Jan. 30, 1933   4 Sheets-Sheet 4
INVENTOR
NICHOLAS BALYOZIAN
BY
Bohleber + Ledbetter
ATTORNEYS Patented Sept. 8, 1936

2,053,314

UNITED STATES PATENT OFFICE 2,053,314

REFILLABLE PLASTIC MATERIAL CONTAINER

Nicholas Balyozian, Mansfield, Mass.

Application January 30, 1933, Serial No. 654,335

10 Claims. (Cl. 257—14)

This invention appertains to container or barrel constructions and receptacles such as shipping drums and the like, and more particularly relates to the re-fillable use thereof in the handling, shipping, storing, and the emptying of solid materials having a low melting point and semisolid or viscous liquids.

The invention provides novel facilities for handling materials of the class in question such as the variety of resins, phenols, asphalts, waxes and tars generally transported in one-use containers which are broken open and thus destroyed in removing these solids and semi-solid or plastic materials and viscous liquids such as chinawood oil, linseed oil, castor oil, glycols, glucose, and glycerine which are difficult to remove from their containers.

The handling of the above named materials and liquids presents a problem in the industry as regards shipping, storage and emptying same when received at the consumer's plant or other destination. It is the general practice, in the case of solid materials, to chop or break open the shipping containers and thus remove the contents such as tar, resin, gum and the like. This destroys the containers and prevents their re-use and leads to expense, and it is a general purpose of this invention to provide re-fillable barrel means for shipping, storing and emptying these materials into a kettle or vat for further preparation and use.

Furthermore, the chopping and breaking open of the shipping containers to get at or free the contents thereof is an awkward and hazardous operation at best since axes or other tools are used to break open drums or containers with the result that the material is scattered and subjected to dirt and other unsanitary conditions on the work floor, to say the least of the danger to workmen from the axes and also contact with flying materials or chips and pieces of lethal materials, many of which are corrosive and destructive. My invention provides a safer and more sanitary method of handling these materials, and eliminates the necessity of collecting the broken pieces and chips after the barrel has been chopped open, avoids the loss of material which adheres to the container walls or pieces thrown away or wasted by careless workmen, and avoids getting the material dirty in the process of breaking open the present-day containers.

Therefore, it is an object of this invention to produce re-usable barrel means or shipping and storage drums which are rugged in construction, have long life, are capable of being heated for the purpose of melting and draining out the viscous and semi-solid materials; and the barrels may be used continuously for shipments from the producer to the consumer.

A further object is to produce several types or forms of barrel or drum constructions, any number of which may be connected together on a service line for heating one or more barrels to warm and re-soften the congealed or hardened contents to a viscous pouring consistency so that the barrels may be completely drained and no material remains therein to waste. This heating line may comprise either an electric power line for raising the temperature of electrical heating elements provided in the drums or consist of a heating fluid line such as a steam, hot water or hot oil pipe lines to heat the barrel and its contents.

Another object is to produce combination apparatus for emptying the barrels, wherein one or more barrels constitute an element of the combination; and the invention addresses itself to the production of barrels which readily connect with the emptying apparatus.

This invention promotes the development and wider use of synthetic resins and other like materials, effects savings in both the materials and shipping containers, and otherwise fills a need felt in the industry and chemical field for a solution of the problems involved in the handling of these materials.

With the foregoing and other objects in view, the invention has relation to the novel uses disclosed in respect to shipping and storage containers, the problems solved in respect to more economical means for handling viscous and semi-solids, the mode of application and use as regards emptying and re-use of the various types of barrel structures illustrated in the accompanying drawings which show several examples of the invention to bring out the breadth thereof, as follows:

The first example of the invention in Figure 1 is a longitudinal section through a barrel or shipping and storage drum constructed in accordance with the principles of this invention and showing a peripheral jacket means about the barrel sides.

The second form of the invention is shown in Figures 2 and 3, wherein Figure 2 is a longitudinal section of a barrel having a combination cylindrical and head or end jacket means by which the entire surface area of the contents is heated for the purpose of re-softening and draining the same from the barrel. Figure 3 is a cross section on the line 3—3 of Figure 2.

A third form of the invention is represented in Figures 4, 5, and 6 wherein is shown barrel emptying apparatus to bring out the method and manner of use in emptying any one or more of the several types of barrels.

Figure 4 illustrates a barrel emptying its contents into a receiving vat or kettle and a fluid pressure heating line having a pressure reducing valve therein and a return pipe line with a pressure entrapping means such as a steam trap, and this view is a section on the line 4—4 of Figure 5. Figure 5 is a plan view of the structural combination shown in Figure 4. Figure 6 shows a side view of a plural barrel apparatus set up for emptying one or more barrels at a time and likewise shows a pressure feed heating line including a pressure reducing valve and a steam trap. This apparatus is adapted to be connected with service steam lines or boilers of any capacity, or may be used to supply hot water, hot oil or other heating medium to the barrel or barrels being emptied.

A fourth form of the invention is illustrated in Figures 7, 8, and 9 and relates to an electrically heated re-fillable barrel means having a water heat distribution means.

Figure 7 is a longitudinal section of the electrically heated shipping drum or barrel having jacket means about the entire surface thereof, sides and heads, for liquid heat distribution from an electrical heater to re-soften the hardened or viscous contents of the barrel to facilitate emptying same. This view may be considered as taken on the line 7—7 of Figures 8 or 9. Figure 8 shows a cross-section on the line 8—8 of Figure 7. Figure 9 is a bottom end view of the electrically heated barrel.

The first form in Figure 1

This species of the invention comprises a simple form of barrel construction including peripheral or side wall jacket means with hot fluid inlet and outlet ports for circulating hot water, oil, steam or other fluid heating mediums around the material to be melted out of the barrel for emptying purposes.

The barrel or container itself comprises substantially flat container heads 10 and 11 fitted into the ends of a body 12 usually cylindrical in shape. Either one or both barrel heads 10 and 11 may be formed with flanges 13 fitted into the end portions 14 of the barrel or inner cylindrical body 12. The barrel ends 14 may be flanged, flared or swaged outwardly, as indicated at 15, by which to form an annular jacket or heat receiving space 18 between the two barrel shells or walls as will now be explained.

A jacket means or outer cylindrical body 17 has each end 16 thereof fitted and joined to the double-ply flange construction 13, 14 of the barrel. The jacket means 17 may be fashioned or rolled into a true cylindrical form of a uniform diameter from one end to the other to afford a barrel or drum construction having a smooth exterior, and hence the inner container body 12 preferably has, in the illustrated construction, its ends 14 drawn or fashioned outwardly at 15 by which to afford the annular heating space 18 extending entirely around the inner wall or body 12 and from end to end thereof. This heat receiving space 18 is closed by the joinder of the barrel ends 14 and 16.

A heating fluid inlet port 20 and outlet or return port 21 are made through the jacket 17 and communicate with the annular heating space 18. Ordinarily the jacket 17 is made of comparatively thin or light gauge metal and hence a thicker or reenforced construction is provided at the ports 20 and 21 by which to afford pipe thread connections. To this end, a flange or other reenforcing means 22 is secured to or made on the outer shell 17 for the screw threaded inlet port 20 and outlet port 21 to receive pipe connections of the barrel heating means or emptying apparatus, examples of which are illustrated in Figures 4, 5, and 6.

The head 10 of the barrel is provided with a fill inlet 24 ordinarily closed with a screw plug 25 threaded into a flange or reenforced body or stock portion 26. The plug 25 is removable for pouring the viscous or softened material into the re-fillable barrel for shipment and storage. Likewise, a drain or discharge opening or spout is provided in the bottom end 11 and comprises an apertured flange 27 internally screw threaded for the reception of a plug 28. This discharge plug 28 is preferably a little larger than the fill plug 25 so as to hasten the emptying operations which take place when both plugs 25 and 28 are removed and the heating chamber or jacketed space causes the hard or thick material in the barrel to soften and flow out.

Either a welded or riveted barrel construction may be resorted to, and for the purposes of this illustration there is shown rivet means 30 for joining the flange ends 13, 14, and 18 together to produce a rugged drum or container three-ply construction in the form of out-turned flanges which afford concave barrel ends. Likewise the flanges or reenforcement plates 22, 26 and 27 may be welded or riveted in place where necessary to provide adequate screw threaded apertures for the closure plugs 25 and 28 and for the inlet and return pipes of the heat circulating system employed to raise the temperature of the barrels.

It is important to note that in many instances the riveted construction indicated generally at 30 is preferably dispensed with either for a part or the entire barrel construction and the welding of the parts resorted to. For example, the two barrel end flanges 13 and 14 and the jacket end 16 may all preferably be welded together in one homogeneous structure and thus provide a multi or three-ply reenforced flange construction which produces a barrel unusually strong and rugged at its end edges where it is subjected to a severe use in shipping and storing operations involving the handling of materials of considerable weight.

In this and other forms of drum and barrel constructions, it will be understood that corrugated sheet iron may be used in manufacturing the re-fillable barrels. For the construction of certain forms of the barrels for very heavy materials, one or both inner and outer concentric shells 12 and 17 are preferably corrugated to produce a more rugged construction. The barrel ends or heads may be designed concave or convex in accordance with the best practice and requirements of the industry.

The foregoing description is made in reference to the first example of the invention comprising the barrel per se, and after other forms are explained, a further statement will be given of the several uses and emptying processes to which one or more of the barrel means may be used as an element in the heating and emptying apparatus, and which so fully contribute to the chemical industry in the particular branch thereof named.

The second form in Figures 2 and 3

This form of the invention consists of re-fillable barrel means for re-use in emptying operations and embodies a jacket entirely surrounding the contents of the viscous or semi-solid materials. There is combined end or barrel head jackets with a cylindrical or side wall jacket. In this way the barrel contents are more rapidly softened and reduced to a draining or pouring consistency to promote the emptying process.

To the above ends, there is provided an inner container usually comprising a cylindrical body 32 closed by ends or heads 33. These barrel or container parts have their abutting ends and flange portions either riveted or welded together as heretofore explained to produce a double-ply out-turned peripheral flange 34. The two-ply flange end 34 provides a seat or rest to receive and grace the outer heads or jackets as will be explained.

A cylindrical outer shell 35 provides a jacketed annular heat receiving space or chamber 40 around the inner container 32 which extends from end to end of the barrel and entirely surrounds the inner barrel wall 32. Barrel end jacket heads 36 are secured to a radial flange 37 formed at each end of the outer jacket 35. These jacket heads 36 preferably rest against and are welded to the out-turned double-ply flanged periphery 34 of the inner container 32, 33 and this arrangement produces a rugged reenforced barrel construction. Furthermore, there is formed an end heating jacket or chamber 39 at each end of and adjacent each inner barrel head 33.

The two heating spaces 39 and 40 are connected by passages 41 formed in or cut through the out-turned flange 34. The passages 41 afford complete circulation between the end heating spaces 39 and the peripheral jacketed space 40 for any heating fluid such as steam, hot water or hot oil which may be transmitted to or circulated through the heat receiving combination chamber 39, 40. Thus the viscous or semi-solid contents hardened within the inner barrel walls 32 and 33 are entirely surrounded by the jacket means 39, 40. This provision makes possible a rapid re-softening and liquefying of the congealed contents for emptying purposes.

A flanged sleeve 43 is located centrally at each end of the barrel and either welded or riveted in place to produce a rigid joinder between the inner and outer container heads 33 and 36 at the top and bottom ends of the barrel. These spacer members 43 strengthen the double headed barrel ends by bracing the central portions of the adjacent flat ends 33 and 36. The flanged members 43 also reach through the heating spaces 39, are made in the form of sleeves, and serve as fill and discharge openings.

The upper end of the barrel and its flange 43 is provided with a fill or receiving opening 44 closed by a screw plug 45. The lower end is similarly fitted with a discharge opening 46 closed by screw plug 47. Thus each flange 43 comprises a sleeve, internally screw threaded, and reaching through the end heating spaces or jackets 39 at the ends of the barrel. Both plugs 45 and 47 are shown removed as during the emptying operation.

A fluid heating inlet 48 and outlet 49 connect with the combination jacket or heating space 39, 40 by which to circulate through it the steam or any other heating medium received from a boiler or other heating appliance. Preferably the inlet 48 is located at the upper end of the barrel and the outlet 49 comprises a return to a steam boiler or other heating appliance for the fluid heating medium. In the example shown, the inlet and outlet ports 48 and 49 are provided in the outer cylindrical or side wall jacket 35 but it is understood that said connections 48 and 49 may also be formed in the barrel jacket heads 36. Furthermore, it will be understood that one heating receiving connection, either 48 or 49, may be used in certain cases where the heating medium is merely received into but is not necessarily circulated through the barrel.

*The third form shown in Figures 4, 5, and 6*

The illustrations presented in Figures 4, 5, and 6 disclose the mode and use of the invention in its several forms and more particularly to the emptying of one or more barrels by a heating process to re-soften and liquefy the congealed viscous or semi-solid materials shipped, stored and drawn from these barrels to render them reusable. While the three views show means and apparatus for emptying the simpler type of barrel in Figure 1, it is to be understood that the apparatus is adapted for use with any form of barrel having fluid heating jackets.

Referring first to Figures 4 and 5 for single barrel emptying use, there is shown a receiving vat 51 into which the congealed viscous material M is emptied after being re-softened to a pouring or flowable consistency. An inlet fluid heating pipe 52 connects with the inlet port 20 and includes a pressure reducing valve 53 comprising a part of this combination. The pressure reducing valve 53 is provided with an adjusting screw 54 to regulate the internal pressure control mechanism within the valve housing means 53. In this invention and its combination of elements, there is employed any well known form of pressure reducing valve 53, 54. A cut-off valve 55 is also included in the feed pipe 52 to start and stop the flow of steam or other fluid heating medium to the barrel. It is now appreciated that the feed pipe 52 may be connected to a high pressure fluid heating means such as a steam boiler or other instrumentalities for supplying a heating fluid under pressure to the annular jacket 18 and that said supply can be delivered at a regulated reduced pressure by reason of the reducing valve 53.

An outlet or return pipe 57 connects with the outlet port 21 and returns the fluid pressure heat to a boiler or hot water supply, not shown. A cut-off valve 58 may be provided in the return line 57 if desired. Of particular importance is a pressure trap included in the return or outlet pipe line 57 and which I have illustrated generally at 59. This pressure entrapping means 59 takes the form of any suitable and well known form of steam trap, the function of which is to conserve the steam pressure in the heating jacket 18, 40 or others, thus retarding the steam flow therethrough. Where steam is employed to heat and melt out the drums, it is desirable to retard the flow of steam through the barrel jackets and the steam trap 59 performs this purpose and thus economizes in the pressure heating medium. The use of a hot oil or water flow through the barrel jacket does not necessarily require the trap means 59.

In Figure 4, the heating jacket 18 is filled with steam, the temperature of the barrel has been raised to working limits and the semi-solid material M, such as tar, wax or other material, has softened to a liquid or pouring consistency and is discharging downwardly into the vat 51. No waste occurs, either in material emptied into the vat or in the barrel which is now ready for return to the producer for re-filling with the same or a like commodity. Furthermore, there has been saved the hazardous or wasteful chopping operation of breaking open barrels and then collecting together the scattered pieces of tar or other material.

Figure 6 shows a plural heating and emptying apparatus and its mode of use. There is shown a series or number of barrels connected in parallel or multiple with control valve mean illustrating how my invention is adapted to large scale operations and the emptying of one or more barrels at a time on a large receiving vat 61.

Cross bar supports 60 are placed on the vat 61 and the barrels 17 rest thereon. A plurality of barrels are shown above the vat 61, some of which are in the process of being emptied and others are either completely emptied or comprise newly received full barrels of material being made ready to heat and empty. A fluid heating feed pipe 62, for hot water, oil or steam, connects with the upper portion of the barrels 17, while a return pipe 63 connects with the lower ends of the barrels. A number of feed taps or branches 64 are provided along the feed pipe 62. Each branch or pipe take-off 64 includes a cut-off valve 65 so that each barrel 17 on the vat 61 can be individually controlled in respect to its supply of heating fluid received from the feed pipe 62. A heating fluid flows in a right-hand direction through the feed pipe 62 from a steam boiler or other source of supply, not shown, to such barrels 17 as may have their valves 65 open and returns in a left-hand direction through the pipe 63 to said source of supply.

In case it is desired to use steam or other fluid pressure heating means to be transmitted through feed and return piping 62 and 63 or conduit system, it usually follows that I provide a pressure reducing or regulating valve 66 having a conventional pressure regulating screw 67. In this way the inlet pipe 62 has its pressure reduced below that of the source of supply which is usually greater than necessary for the purposes of this invention, and hence the pressure is modified to a mere 10 or 20 pounds pressure which is ordinarily of sufficient temperature for heating the one or more barrels 17 to empty its contents. Likewise, if steam heating is used, a steam trap 68 is included in the return pipe 63 for the purpose of entrapping and retarding the flow of the low pressure steam back to the boiler so as to hold the steam within the barrel jackets until condensation sets in. The individual heating supply take-offs 64 may be connected and detached from one or more barrels 17 at will, and the valves 65 open or close the branch pipes 64 so that one or more barrels may be heated at a time without interference with the others.

The foregoing arrangement, for single or plural barrel use, provides safe apparatus for emptying the barrel or barrels which are capable of being manufactured quite economically because a comparatively low fluid pressure of 10 to 20 or 30 pounds pressure inside the jacket is sufficient to melt out the materials. Therefore, low pressure inexpensive barrels can be used by the industry and connected to any available steam supply. Ordinarily a steam pressure of from 5 to 40 pounds pressure may be used for melting and emptying various materials. In the event hot oil or water is used to melt out the barrel contents, the pressure reducing valve and steam trap are not necessarily employed. The conduit system with the pressure regulating valve and steam trap means, and the jacketed barrels as elements in the combination, provide material and labor saving means in the particular field of viscous and semi-solid substances to which this invention is directed.

*Fourth form shown in Figures 7, 8, and 9*

In this form of the re-usable barrel, there is employed a combination water and electrical means for distributing heat around the inner container which holds the congealed viscous, plastic or semi-solid materials to re-soften them to a flowable state. This barrel is especially useful for the handling of many commercial forms of plastic commodities used in the chemical manufacturing industries.

An inner cylindrical container or body 70 is closed at its upper end with an inner head 71 and at its lower end with a bottom inner head 72. These two ends or flat heads 71 and 72 may be flanged or otherwise shaped for riveting or welding the same into the container body 70. An outer barrel or body 73 is likewise joined or closed at its ends by jacket heads 74 and 75. Any suitable form of welded or riveted construction may be resorted to and appropriate strengthening ribs or flange means employed at the joining seams of the several heads and body members. The foregoing construction provides a continuously annular and end heating jacketed water chamber 76 formed all around the inner container 70 and at its ends 71 and 72.

An aperture 69 is made in the upper and outer barrel head jacket 76 for the reception of water to fill the jacketed water heating space 76 by which the heat of an electrical heater, to be described, is transmitted to the inner container 70 to melt and empty the contents thereof.

A spaced flange 77 holds the two heads 71 and 74 apart and provides a fill or receiving inlet normally closed by a screw plug 78 for receiving the material at the producer's plant where said material is readily poured while warm into the inner container. Thus plug 78 is later removed during barrel emptying operation at the consumer's plant to hasten the discharge operation.

Within the jacketed heating space 76, and at one end of this re-fillable barrel, say the lower end thereof, there is provided an electrical heater of any suitable form. In the present example of the invention, this heater is more appropriately constructed in the shape of a disk 80 made of insulation and within which is sealed an electrical heating element or resistance 81. Two terminals of the heating element 81 are attached to plug connector jacks or prongs 82 designed for the reception of any standard form of electrical plug connector, not shown, and carried on the end of a flexible electric cord or wire in the usual way.

Electric current is transmitted to the heating element 81 from any electric circuit or power line and quickly raises the temperature of the heating disk 80. The electrical contacts 82 are anchored in an insulating plug body fixture 83 in any approved manner and said fixture 83 is shown appropriately secured to the barrel head or bottom 75. The electrical heater 80, 81 is of any appropriate construction but is rugged and designed for hard usage and immersion in the water chamber 76. The resistance element 81 is sealed within or between the flat sides of the heater body 80. It is also noted that the heater 80 may be supported centrally in the water space 76 by a discharge spout or plug-like sleeve 85 which passes through both inner and outer barrel heads 72 and 75 and by the plug connector block 83 and other means.

The spacer flange or sleeve 85 is secured at the bottom of the drum between the spaced heads 72 and 75 in any suitable manner as by welding it in position and completing the anchorage thereof by a nut 86 which makes accessible the electrical heater 80 if need should arise by cutting out the rivets through the bottom flange of the barrel. This member 85 provides a drain or discharge opening 87 from the inner container 70 out through the bottom portion of the water jacket space 76. The flanged member 85 may appropriately pass through the electrical heater disk 80. A drain plug 88 is screw threaded into the flange 85 and removable for the purpose of draining the viscous material from the inner container 70 of the re-fillable barrel through the use of the heater device 80 and the hot water jacket 76.

In use, the barrel 73 is placed above a receiving vat or kettle, the plugs 78 and 88 are removed and an electrical connection is made at 82. Water is poured into the heating jacket space 76 through the water fill 69 and covers the heater 80, the burner or resistance element 81 of which is impervious to water because sealed with the water proof housing 80. The heater quickly raises the temperature of the water in the hot water annular jacket space 76 and hence the water transmits or distributes the heat from the electrical heater throughout the entire range of the water chamber 76 with the result that the congealed contents are promptly softened and melted out so that all the material and the barrel are saved.

*General features and basis of invention*

There are a number of other factors and equivalent structures which are further instructive to the art and although not actually shown in the drawings will nevertheless be recognized as coming within the principles of this invention and covered by the appended claims. These I will briefly mention as alternative or modified forms of this invention.

One practical modification takes the form of an appliance jacket comprising an open bottom cylindrical jacket in the form of a slip-on or slip-over heating device designed to envelope any form of viscous or semi-solid container. This appliance may be heated electrically, by steam or other means. It is specially devised for conventional containers or non-jacketed barrels and forms an annular heating chamber around the container when placed thereon to entirely cover and heat the barrel for the purposes already explained.

Again I produce a barrel structure carrying jacket means, preferably an annular heating jacket in combination with one end, or head jacket, say similar to the form shown in Figures 2 and 3. The characteristic or outstanding feature of this species of my invention resides in the removable bottom which comprises the barrel head, wherein its fastening bolts are removed, and when the top and sides of the contents are heated, it follows that the weight thereof serves to quickly detach the batch or mass of tar or wax from the interior of the barrel, and the whole lot drops out into the kettle without waiting to liquefy and drain out through a discharge opening as required in other forms of the invention.

There is another species of barrel means comprehended by my claims herein made, and this comprises a container having pipe coils or pipe sections associated therewith, say on the inside of the container. A steam pipe line or other heating system is attached to the piping system in the barrel to heat and melt out the contents. Thus the advantages of a steam jacket, as in Figures 1, 2, and 3, are attained by heating coils or a nest of heating pipes in the barrel.

As to the state of the art, there is no recorded recognition of the problems existing in reference to the present day primitive, destructive and wasteful methods used in transporting and emptying semi-solids, plastic and viscous commodities, many of which are quite expensive to produce. While jacketed containers are in themselves known to the art, it appears that there are not teachings in reference thereto in this field or branch of the chemical industry as regards my particular use and materials handled. Hence the barrels and shipping drums herein disclosed are modified and constructed particularly for my uses and the materials named, and will serve a wide use, promote safety, economy, and promote the development of some of these materials not yet in general use.

What is claimed is:

1. A re-fillable storage and transportation barrel for viscous and semi-solid materials, comprising in combination, a receptacle, a jacket around the receptacle forming a heating space adjacent said receptacle, inlet and outlet pipe connections provided in the jacket to circulate a heating fluid thru said jacket and heating space, a pressure reducing means included in the inlet pipe connection whereby the barrel may be safely attached to any available high pressure fluid heating line and the pressure of that line diminished to safe working pressure and temperature limits, and receiving and discharge openings in the receptacle for filling and emptying the barrel while the material is in a heated state.

2. A re-fillable storage and transportation barrel for viscous and semi-solid materials, comprising in combination, a receptacle, a jacket around the receptacle forming a heating space adjacent said receptacle, inlet and outlet pipe connections provided in the jacket to circulate a heating fluid thru said jacket and heating space, a fluid pressure entrapping means in the outlet pipe connection to retain said heating fluid within the jacket and heating space, and receiving and discharge openings in the receptacle for filling and emptying the barrel while the material is in a heated state.

3. A re-fillable storage and transportation barrel for viscous and semi-solid materials, comprising in combination, a receptacle, a jacket around the receptacle forming a heating space adjacent said receptacle, inlet and outlet pipe connections provided in the jacket to circulate a heating fluid thru said jacket and heating space, a pressure reducing means included in the inlet pipe connection whereby the barrel may be safely attached to any available high pressure fluid heating line and the pressure of that line diminished to safe working pressure and temperature limits, a fluid pressure entrapping means in the outlet pipe connection to retain said heating fluid within the jacket and heating space, and receiving and discharge openings in the receptacle for filling and emptying the barrel while the material is in a heated state.

4. Storage and shipping barrel means for handling viscous and semi-solid materials which soften when heated, comprising a receptacle having a fill and discharge opening to hold the material which congeals therein, a jacket forming a heating space about the receptacle, and a heating device at one end of the barrel means and disposed within the jacket, said heating device comprising a hermetically sealed heater impervious to water; and a water fill inlet being provided in the jacket thru which water is poured to fill the jacket and immerse the heating device, whereby the water is heated to raise the temperature of the receptacle to melt out the material to render the barrel means re-usable.

5. Storage and shipping barrel means for handling viscous and semi-solid material which softens when heated, comprising a receptacle having a fill and discharge opening to hold the material which congeals therein, a jacket forming a heating space about the receptacle, an electrical heater carried by the barrel means; and a water inlet made thru the jacket adapting the latter to be filled with water which flows down to and is heated by the electrical heater, whereby the hot water heats the receptacle to soften the congealed material which flows out to free the barrel means for re-use.

6. Storage and shipping barrel means for handling viscous and semi-solid material which softens when heated, comprising a receptacle having a fill and discharge opening to hold the material which congeals therein, a jacket forming a heating space about the receptacle, the jacket having an opening thru which said jacket is filled with water, a disk at one end of the barrel and immersed in the water, an electrical heater sealed in the disk, an electrical plug disposed thru the jacket for connection with a current supply, and the aforesaid discharge opening extending downwardly thru the disk and thru the jacket.

7. A shipping and storage barrel for re-use in handling viscous and semi-solid materials which soften when heated, comprising a cylindrical receptacle having a fill and a discharge opening, a jacket formed at each end of the receptacle and circumferentially around said receptacle, an electrical heater disposed in the jacket at one end of the receptacle, and a water fill inlet being provided at the other end of the receptacle.

8. A shipping and storage barrel for re-use in handling viscous and semi-solid materials which soften when heated, comprising a receptacle, a heating jacket carried by the receptacle and defining a heating space about said receptacle, a fill inlet disposed thru the heating jacket and space and connecting with the receptacle thru which the softened material is poured and which congeals in the receptacle, an electrical heater in the jacket, a discharge opening formed thru the jacket and leading thru the heating space and being connected with the receptacle and also passing thru the electrical heater to empty the barrel when the material is re-softened by said heater, and a water fill inlet formed in the jacket and connecting with the heating space by which the latter is filled to conduct heat from the electrical heater to all parts of the receptacle.

9. A shipping and storage barrel for re-use in handling viscous and semi-solid materials which soften when heated, comprising concentrically arranged receptacles one within the other, providing a jacketed heating space entirely surrounding the inner receptacle at its ends and its sides, an apertured spacer member anchored between the receptacles at opposite ends of the latter to rigidly hold them together in spaced relation, a closure plug in one apertured spacer member and serving as a fill inlet thru which the material is poured into the inner receptacle, a closure plug in the other apertured spacer member and serving as a discharge outlet to empty the barrel for re-use, an electrical heater mounted in the heating space proximate the discharge outlet, the outer receptacle being provided with a water receiving inlet proximate the fill inlet and thru which the heating space is filled with water to cover the electrical heater.

10. A portable and refillable barrel for storing and transporting semi-solid materials of a viscous or plastic nature when cold, but which soften and liquefy to a pouring consistency when heated, said barrel comprising in combination, a cylindrical receptacle in the form of a portable barrel of a convenient size which can be handled manually and rolled on its side or stood on its end or placed on a support above a vat adapted to receive the heated contents which pour therefrom, the said barrel top and bottom ends forming flat heads for the latter purpose, the barrel being provided with an inlet port having a closure in the head thereof to receive the materials thereinto while heated and hence in a state of pouring consistency, which inlet port is opened to vent the barrel when emptying the heated contents therefrom, and which heated materials thereafter congeal or solidify inside said barrel and adhere to the walls thereof as a consequence of cooling when stored or transported in said barrel, a discharge port having a closure provided in the bottom of the barrel out through which the softened materials discharge into a vat when heated to empty said barrel for re-use in again storing or transporting said semi-solid materials, heating means comprising a jacket surrounding the barrel throughout its height and forming an annular space coextensive with the barrel for a heating fluid therein whereby to raise the temperature of said congealed or solidified materials to re-soften and re-liquefy same to a pouring consistency by maintaining a heating fluid in said annular space until the barrel drains, and an inlet port provided through the jacket and communicating with the annular space by which to introduce said heating fluid thereinto to melt and free the congealed material from the interior walls of the barrel, said jacket extending from end to end of the barrel and forming a circular contact edge at each end on which the barrel may roll or tip to engage the ground or floor or rest upon a support above a vat in connection with manually handling the barrel aforesaid.

NICHOLAS BALYOZIAN.